United States Patent [19]
Collier

[11] Patent Number: 5,724,186
[45] Date of Patent: Mar. 3, 1998

[54] ULTRASONIC REARVIEW MIRROR

[76] Inventor: John D. Collier, 58 Edgewater Drive, Stony Creek, Ontario, Canada, L8E 4Z3

[21] Appl. No.: 687,316

[22] Filed: Jul. 25, 1996

[51] Int. Cl.⁶ .................. G02B 5/08; B08B 7/02; B60S 1/02; H01L 41/08
[52] U.S. Cl. .............. 359/507; 310/322; 310/323; 310/331; 310/332; 310/335; 310/369; 15/250.003
[58] Field of Search .............. 359/507, 512; 310/316, 321, 322, 323, 328, 330, 331, 332, 334, 335, 358, 359, 369; 15/250.02, 250.003

[56] References Cited

U.S. PATENT DOCUMENTS

| | | |
|---|---|---|
| 4,276,491 | 6/1981 | Daniel .................. 310/335 |
| 4,387,973 | 6/1983 | Martin . |
| 4,833,373 | 5/1989 | Doi et al. . |
| 4,929,072 | 5/1990 | Fujie et al. . |
| 5,007,722 | 4/1991 | Mori et al. . |
| 5,012,593 | 5/1991 | Okada et al. ........... 15/250.003 |
| 5,013,888 | 5/1991 | Okada et al. . |
| 5,025,187 | 6/1991 | Fujie et al. . |
| 5,037,189 | 8/1991 | Fujie et al. . |
| 5,076,854 | 12/1991 | Honda et al. . |
| 5,132,840 | 7/1992 | Okada et al. . |
| 5,136,425 | 8/1992 | Fujie et al. . |
| 5,148,312 | 9/1992 | Kawai et al. . |
| 5,155,625 | 10/1992 | Komatsu et al. . |
| 5,166,825 | 11/1992 | Fujie et al. . |
| 5,233,467 | 8/1993 | Ogasawara . |
| 5,418,643 | 5/1995 | Ogasawara et al. . |
| 5,475,530 | 12/1995 | Fujie et al. .............. 359/507 |
| 5,638,209 | 6/1997 | Okada et al. ............ 359/507 |

FOREIGN PATENT DOCUMENTS 1191659  8/1985  Canada .

OTHER PUBLICATIONS

R. C. Buchanan; "Ceramic Materials for Electronics"; pp. 186–191.
Naofumi Fujie, Shoji Okada, Kazuya Tanaka, Tatsuo Toyoda, Gosaku Terabayashi; "Mirror with Ultra Sonic Vibrating Water Cleaner"; Feb. 24, 1992, pp. 1–7.

*Primary Examiner*—Ricky D. Shafer
*Attorney, Agent, or Firm*—John R. Rudolph

[57] ABSTRACT

A device for use in vehicular rear view mirrors which comprises a mirror and a vibrator so arranged to propagate pressure waves or vibrations in the mirror primarily perpendicular to the plane of the mirror. The vibrations are of sufficient magnitude as to cause water droplets to leave the surface of the mirror by atomization of the fine droplets or by the running together of droplets and subsequent dripping off by gravity. The bonds between the mirror face and other solid deposits including ice are quickly broken allowing the debris to fall clear, thus enhancing the clarity of vision of the mirror. The vibrators are ceramic piezoelectric transducers mounted in a Bi-Morph configuration directly on the back of the mirror.

15 Claims, 4 Drawing Sheets

ULTRASONIC REARVIEW MIRROR

FIELD OF INVENTION

This invention relates to a self-cleaning plate shaped device which is suitable for a vehicle mirror having the function of removing water droplets and solid debris from the surface with ultrasonic vibrations provided by piezoelectric transducers.

BACKGROUND OF INVENTION

It is important for drivers of automotive vehicles to have a clear, unobstructed view of the road. This clear view includes the ability to see on-coming traffic from behind in rear view mirrors. Where rear view mirrors are located outside of the vehicle, rain, snow, dirt and other debris pose significant problems with respect to maintaining a clear rear view.

In an attempt to maintain a clear view in exterior-mounted rear view mirrors, cleaning devices utilizing ultra sonic vibrations have been developed. The ultra sonic waves are typically induced by means of electric current supplied to a piezoelectric vibrator. In one type of arrangement, as described, for examples, in U.S. Pat. Nos. 5,136,425 and 5,025,187, the placement of a piezoelectric element is directly onto the back of a plate member. The position disclosed in these patents for the piezoelectric element is a central location. In addition, there is emphasis on the requirement of the element being smaller than the plate member. However, in order to remove water drops uniformly from the mirror glass, it is necessary to apply vibrations evenly to the whole mirror glass and in arrangements where the piezoelectric element is located directly on the back of the glass plate the efficiency of removal of water droplets is not satisfactory.

Other devices have attempted to overcome these problems by transposing the diametral expansion and contraction of the transducer to the mirror through spacers, diaphragms and other linkages. Examples of these may be found in U.S. Pat. Nos. 5,155,625 and 5,148,312. However these arrangements are not entirely satisfactory as they are bulky and require a significant amount of energy in order to achieve clearing of the mirror.

In still other approaches to solving this problem a vibration plate is combined with a heating element (see for examples U.S. Pat. No. 5,132,840 and 5,155,625). In such art, the piezoelectric element is disposed on the back of the glass plate along with a heating element.

In all such ultrasonic mirrors developed thus far, deflection is induced into the mirror from the edges of the mirror so that waves cross each other thus giving a very random pattern of waves in an attempt to result in uniform atomization across the surface of the mirror. In addition, such mirrors are generally expensive to produce and require significant power consumption (typically 60 watts per mirror) in order to operate.

SUMMARY OF THE INVENTION

The device embodied in the present invention utilizes the diametral vibrations of one transducer against the diametral vibrations of an equal transducer thus causing them to curve radially in one direction and then to reverse the direction as the polarity of the oscillating voltage changes (a "Bi-Morph" configuration). As a result, the plane of the dominant waveform generated by this arrangement is perpendicular to the plane of the plate to which the transducers are applied. This arrangement is a relatively inexpensive, effective means for clearing a mirror of foreign particles and requires low energy input for operation. Where the foreign particles are water, the invention causes droplets to meet and combine so that their weight is sufficient to overcome the surface tension, and thus gravity causes them to slide down the surface of the mirror until they fall off. Those water droplets which do not leave the surface of the mirror in this way are removed by atomization, leaving the surface of the mirror as vapour which is carried away by wind.

The "Bi-morph" configuration is common practice in the design and construction of large loudspeakers used in exterior settings where the primary objective of the arrangement is to obtain significant mechanical movement with a minimal amount of electrical energy. The Bi-morph configuration is, however, unknown in the ultrasonic mirror art.

In an embodiment of the present invention, a mirror is attached to one side of a curving oscillating pair of transducers and thereby has a series of curves or deflections imparted to it.

According to one aspect of the present invention a pair of transducers is mounted centrally on the face of a mirror and the deflections or waves produced by the pair of transducers emanate radially across the face of the mirror; in this way the dominant wave, which is perpendicular to the plane of the mirror, sweeps across the entire face of the mirror. While some echo waves return from the edge of the mirror, these are of less amplitude and have little cancelling effect.

According to an arrangement of the present invention a mechanical oscillating circuit permits vibrating deflections or pressure waves to be imparted to a mirror with minimal losses.

Therefore, in accordance with the invention disclosed herein there is provided a self cleaning plate unit comprising a planar plate member and a vibrating means mounted on the plate member. The vibrating means is for producing a standing wave form the plane of which is substantially perpendicular to the plane of said plate member. The standing wave is produced at a uniform frequency, substantially equal to the corresponding resonant frequency of the plate in order to remove foreign substances from the surface of the plate. The vibrating means contacts the plate member over an area whose diameter is smaller than or equal to half the wavelength of the operating frequency of the plate. The vibrating means is comprised of two vibrating units, one of which is in direct contact with the surface of the plate.

According to another aspect of the present invention, the vibrating means of the self cleaning plate unit comprises two transducers in a bi-morph configuration. These transducers have piezo-electric behaviour whereby they expand and contract in direct proportion to the voltage applied across any two faces and as such an oscillating voltages causes an oscillation of expansion and contraction or vibration.

Physical characteristics of the plate member which determine the resonant frequency of the plate are affected by variations in temperature consequently during operation of the within invention, the voltage applied to the transducers and subsequent vibration of the transducers will cause the temperature of the transducers to change. This in turn alters the resonant frequency of the plate member. Accordingly, the self cleaning plate unit of the present invention operates in a manner such that the frequency of the transducers varies in accordance with the characteristics of the plate member during operation so as to maintain resonance.

In accordance with another aspect of the present invention the transducers have the same dimensions and are circular ceramic piezoelectric transducers which are located centrally on the plate member. In accordance with a further aspect, the plate member is attached to a housing by foam where the foam supports the plate member over the majority of its surface and allows attachment of the plate member to the housing without resulting in significant dampening of the standing wave form generated by the vibrating units.

In yet another aspect of the present invention there is provided a self cleaning mirror unit comprising a planar mirror, and two ceramic piezoelectric transducers mounted directly on the non-reflective side of the mirror in a "Bimorph" configuration. With such an arrangement is produced a standing wave substantially perpendicular to the plane of the mirror at a uniform frequency which is substantially equal to the corresponding resonant frequency of the mirror. This wave operates to remove foreign substances from the surface of the mirror. These transducers are both the same size and contact the mirror over an area whose diameter is smaller than or equal to half the wavelength of the operating frequency of the mirror.

In accordance with a further aspect, the mirror is attached to a housing by foam where the foam supports the mirror over the majority of its surface and allows attachment of the mirror to the housing without resulting in significant dampening of the standing wave form generated by the transducers.

DESCRIPTION OF THE INVENTION

Figure 1:
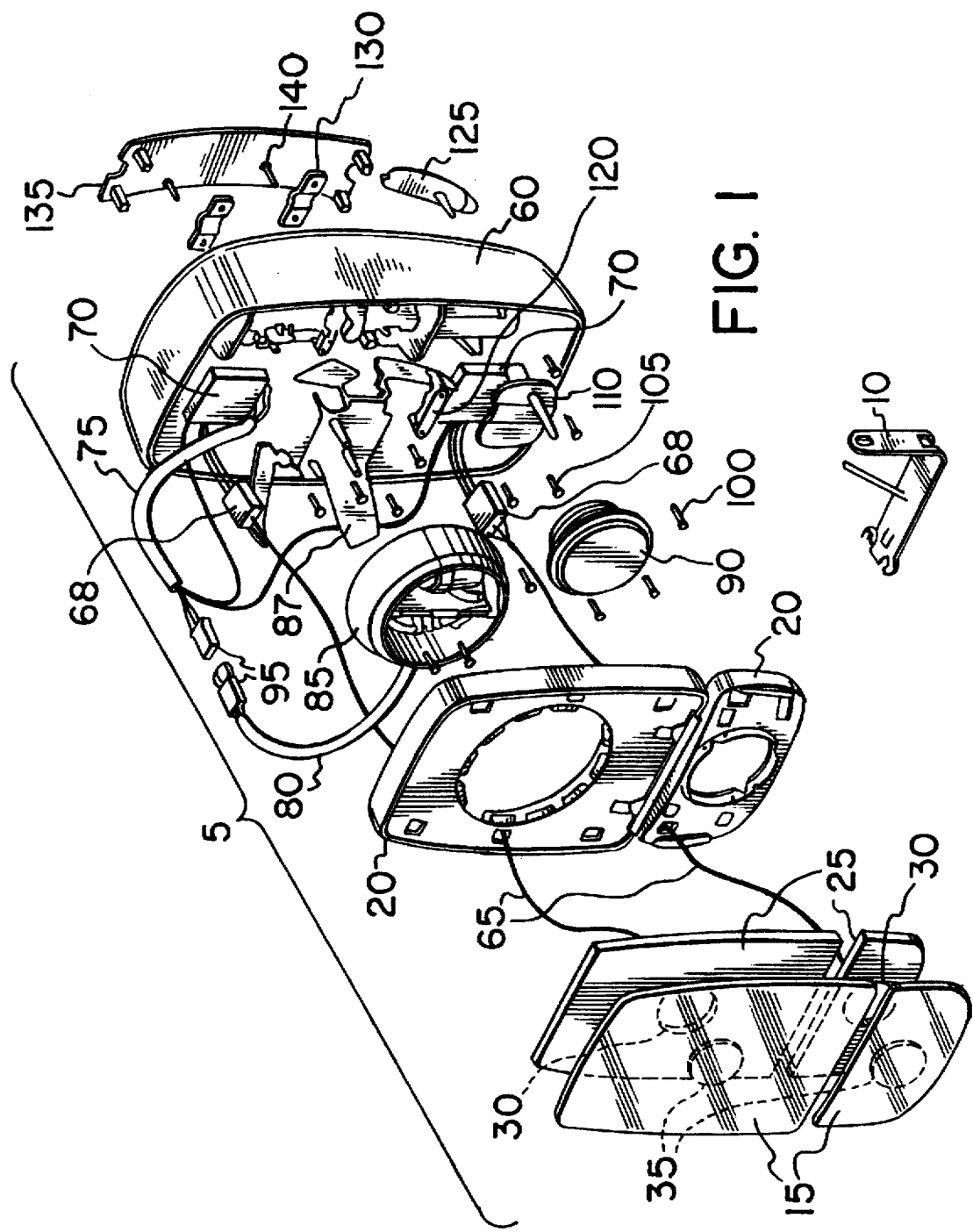
FIG. 1 is an exploded view of a full mirror assembly in accordance with the present invention.

Referring now to the drawings and more particularly FIG. 1, an embodiment of the present invention is illustrated providing a view of the elements of a desired installation of the invention, namely the mounting of an assembly to the mirror housing and hence to a vehicle. The mirror assembly 5 is attached to a standard mirror attachment 10 which is attached to a motor vehicle. The mirrors 15 are attached to a housing 20 using double faced adhesive foam pads 25. In the embodiment illustrated in FIG. 1 there is an upper carriage and a lower carriage housing. The foam pads 25 have essentially the same exterior shape as that of the mirror behind which they are located. Each has a round hole 30 centrally located which is slightly larger in diameter than the transducers. This is in order for the foam pad to support all of the mirror except for the area where the transducers are located. The foam pads have two main functional requirements: 1. light, having very little memory, or retentivity; and 2. either a closed cell construction or having the ability to be sealed on all exterior faces against the intrusion of water and dust. Both of these embodiments change the elastic behaviour of the foam. The selection of material type for these pads is very important to support the vibrating mirror and ensure proper wave formation in the plate member. Care is taken to ensure that the pad is sealed to reduce the chances of ingress of water or dust which will impair the transducer assembly properties and hence the performance of the mirror. The foam gives support of the mirror over the majority of its rear face such that during operation of the vehicle the mirror does not move or wobble due to vehicle vibrations caused by uneven roads or from the engine. Furthermore the foam allows attachment of the mirror to the housing without resulting in significant dampening of the wave form generated by the transducer. In an alternative embodiment where the mirror is not contained within a housing, the foam element is not required.

The upper and lower carriage housings 20 for each mirror fit into a receiving housing 60 which contains the electrical power circuit for the transducers. The electric wiring from the transducers 65 are connected to their respective power circuits or electronic drivers 70 through a connector which are in turn connected by wiring 75 by connective wiring 80 to the direct current power supply, or electric actuator 85. The connection between these wires is made through an appropriate connector 95. The power supply 85 is attached to the housing 60 by an upper power supply mount 87. Just below this is an internal clamp 120. Also incorporated in the set-up is a small electric actuator 90, which supplies power to the lower transducers in this embodiment. This power supply is secured by a lower motor mount 110. Various of these parts are secured by various screw types, namely a Phillips pan head screw 100, a hex-socket cap screw 140 and a hex washer head screw 105. In the embodiment shown in FIG. 1 access to the internal part of the housing 60 from the back is possible through a large cover 135 and a small cover 125. A clamp 130 is disposed between large cover 135 and the housing 60.

Figure 2:
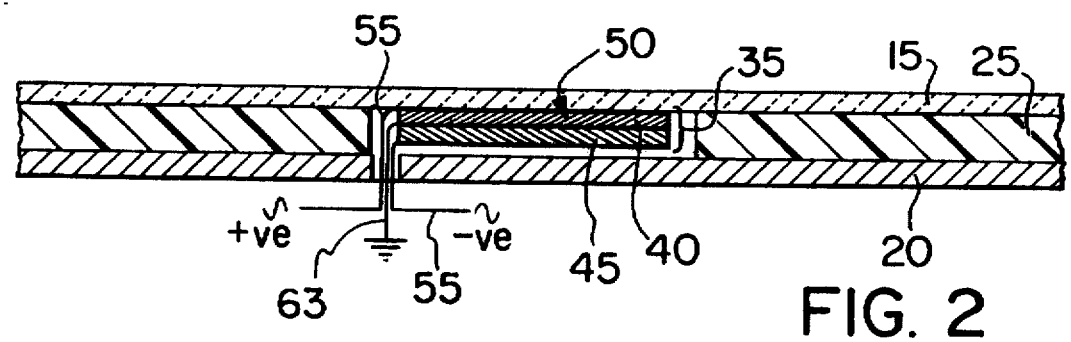
FIG. 2 is an illustration of a view from above the top of a mirror and transducer arrangement of the present invention.
Figure 5:
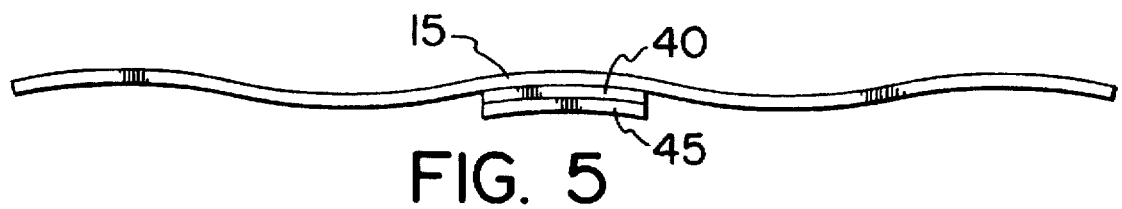
FIG. 5 is an illustration of the dominant wave form and relative size of a transducer of the present invention.
Figure 7:
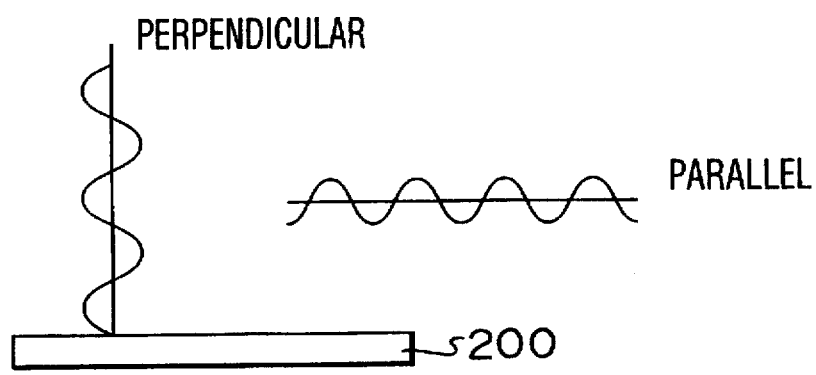
FIG. 7 is an illustration of the spatial relationship between the axis of the dominant waveform generated by the vibration means of the present invention and the plane of a mirror to which said vibrating means is attached.

In the vehicle mirror 5 illustrated, two conventional glass mirrors are shown having ceramic transducers 35 mounted on the reverse face, or non-reflective side of the mirror. The transducers are in a disc shape and are mounted with two faces common and one diametral face mounted on the mirror. This relationship is better illustrated in FIG. 2. The two disc shaped transducers, or vibrating units, referred to herein as transducer A 40 and transducer B, 45, each have a maximum diameter of one half a wavelength of the operating frequency of the mirror. A brass shim is located between transducer A and transducer B at the common face. The shim allows voltage to be applied to the diametral face of the transducer while allowing the transducers to lie flat with minimal space between them. The foam 25 can be seen to surround the transducers which as a unit are referred to as a transducer couple or the transducers 35. FIG. 5 provides an illustration of the relationship between wavelength and transducer diameter of the present invention. If the speed of sound in glass is approximately 5,000 metres (M) per second (s), and the operating frequency is 50 KHz then the wavelength will be 100 mm. In such circumstances the maximum diameter of the transducers would be 50 mm. Further, the transducers, should not be any greater than 3 mm in thickness. Although in a preferred embodiment both transducers are of the same dimensions, it will be understood that the two transducers may be of different sizes and dimensions including the thickness of the transducers so long as neither is of a diameter greater than one half a wavelength of the operating frequency of the mirror. In order to appreciate the nature of the spatial relationship of the dominant waveform generated by the transducers of the present invention, reference is made to FIG. 7 wherein 200 represents a mirror. The orientation of the axis of a sinusoidal waveform which is perpendicular and another which is parallel to the mirror 200 is illustrated. The waveform of the present invention is radially propagated having the plane of the waveform perpendicular to the plane of the mirror, or plate member to which the transducers are attached.

An additional factor in determining transducer size is power dissipation. In a preferred embodiment for continuous use there should be supplied one Watt per square centimetre of transducer. In a transducer which has a 50 mm diameter, the surface area is approximately 19.63 square cms. In a preferred embodiment 19 Watts of power on a continuous basis drives the mirror transducer assembly. In an alternative embodiment the power supply is increased but is applied intermittently, for example 50% on and 50% off.

Figure 3:
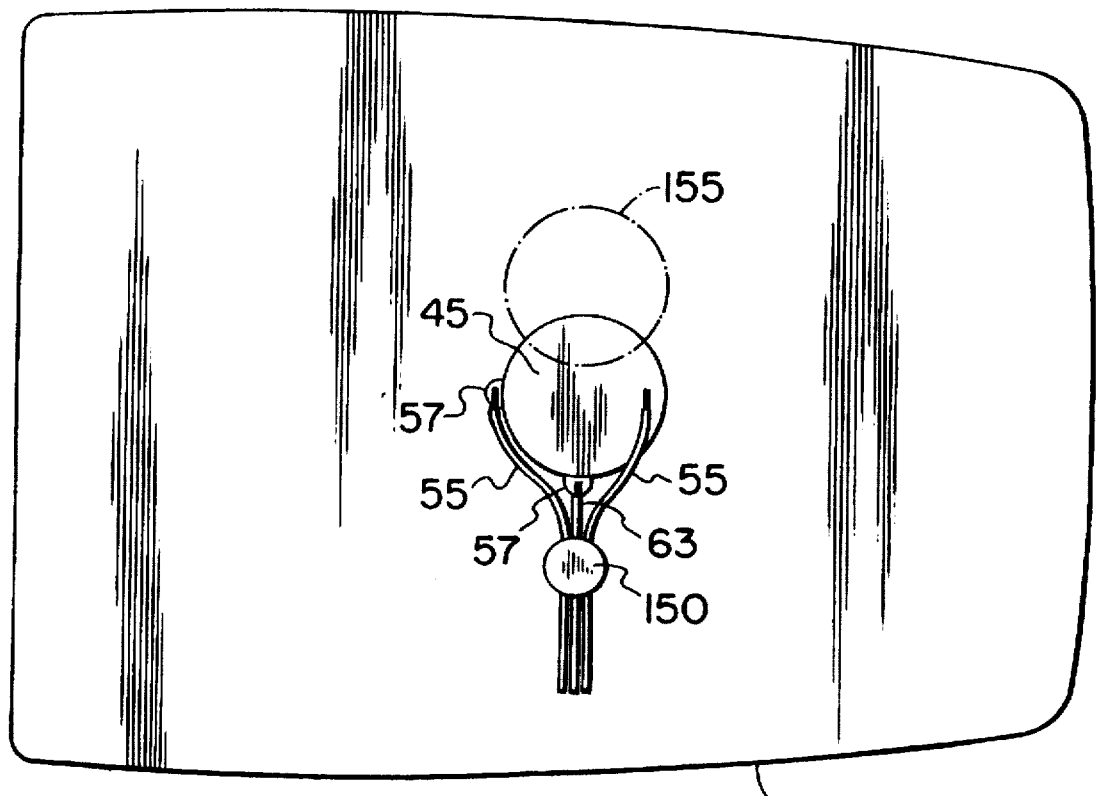
FIG. 3 is a view of the rear face of a mirror illustrating the orientation of transducers and associated wiring of the present invention.

The transducers have a conductive coating on both diametral faces which in a preferred embodiment is nickel or silver. The two transducers are bonded together using an adhesive which allows electrical continuity between the common faces. The transducers 35 are then bonded, using an adhesive, to the rear face of the mirror. In a preferred embodiment the adhesive to bond the transducers together and onto the back of the mirror is Epoxy™. The transducer couple 35 is preferably mounted in a central location on the mirror however an alternate location, as suggested in FIG. 3 by number 155 is acceptable. Conductive leads 55 are attached to the common face of the transducers 50 and to the outside face of transducer A by metal tabs 57. A conductive lead 55 is connected directly to the face of transducer B. The common face connection is grounded 63. Referring to FIG. 3, these leads, or wires, are anchored to the rear face of the mirror with tape or some other suitable type of adhesive material 150.

In operation an oscillating voltage is applied to one outer face connection of transducer A, while a similar but polarity reversed oscillating voltage is applied to the outer face of transducer B. The response of the two bonded together transducers is to alternately expand and contract radially causing the assembly to bow first in one direction and then in the opposite direction. The mirror which is also bonded to this assembly has these deformations imparted to it.

Figure 4:
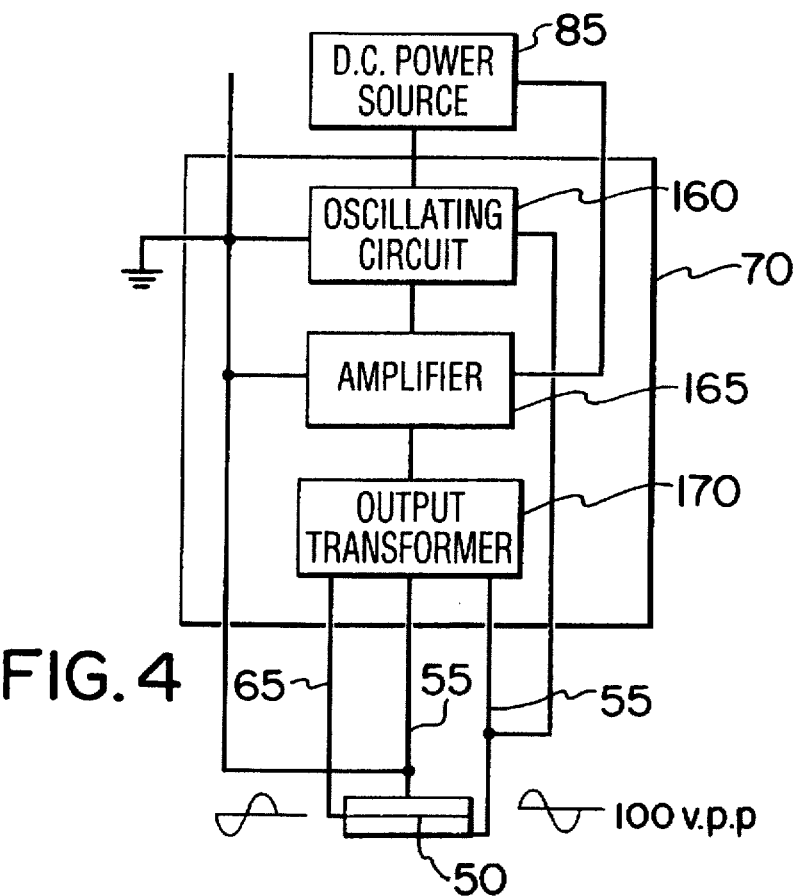
FIG. 4 is a schematic representation of a power supply of the present invention.

Referring now to FIG. 4 in a preferred embodiment the electronic driver circuit 70 is an individual circuit for each mirror comprising an oscillating circuit 160 using the D.C. power source of the vehicle 85. The output of the oscillator is amplified by an amplifier 165 and transformed, by an output transformer which has feed back facilities 170. This will be well known to those practising in the art. The complete circuit is sufficiently compact to be installed in the front of the mirror housing just behind the back face of the mirror.

Figure 6:
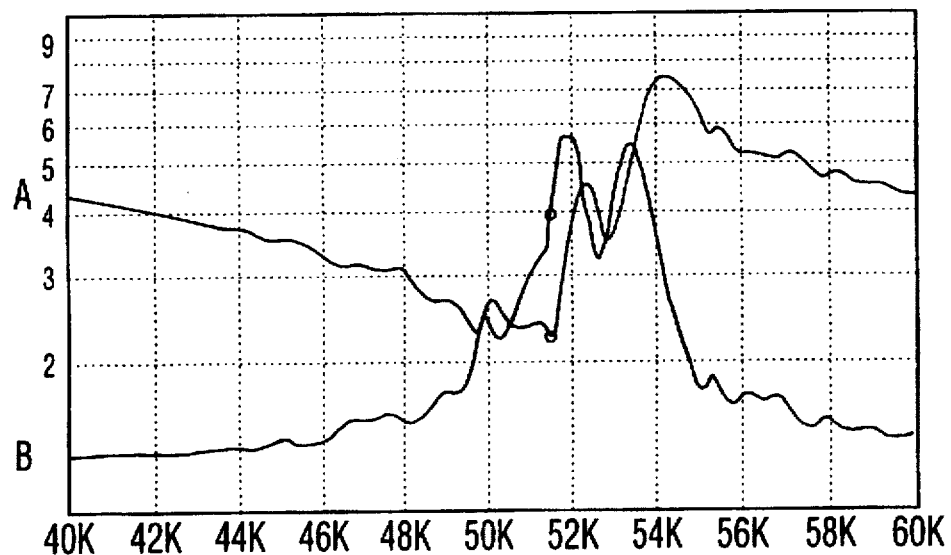
FIG. 6 is a graph illustrating the relationship between the impedance and frequency of operation of a pair of transducers of the present invention.

In operation the circuit is designed to drive the transducer assembly 35 at the dominant resonant frequency in the 30–60 Khz. range. This is achieved by alternating from one resonance to the next where the resonant nodes are highly apparent (see FIG. 6). In this way the nodes are moved so as to achieve a complete cleaning of the mirror surface. FIG. 6 illustrates the relationship of impedance vs. frequency of a Bi-morph configuration of a pair of transducers of the present invention and various resonances and anti-resonances can be identified. In FIG. 6 impedance units (ohms) are on the ordinate which has a logarithmic scale, and frequency units are on the abscissa (k=kilohertz). A represents impedance and B represents phase angle. The Bi-Morph transducer mirror assembly which provided the results of FIG. 6, shows that the dominant resonancy is 51.55 Khz, and at that frequency the impedance is 2.23589 Kohms and the phase angle is –39.875 degrees. Some mirror shapes may result in annular nodes being very apparent because of accumulations of water at those points, in such cases two dominant frequencies would be used, alternately switching approximately every 0.5 seconds. The change in frequency causes a change in wavelength hence a change in position of nodes.

While the invention has been particularly shown and described with reference to preferred embodiments, it will be understood by those skilled in the art that various other changes in form and detail may be made without departing from the spirit and scope of the invention.

We claim:

1. A self cleaning plate unit comprising a planar plate member, and a vibrating means mounted directly on said plate member for producing a standing wave substantially perpendicular to the plane of said plate member at an uniform frequency, substantially equal to the corresponding resonant frequency of said plate member in order to remove foreign substances from the surface of said plate member, said vibrating means is comprised of two vibrating units one of which contacts said plate member over an area whose diameter is smaller than or equal to half the wavelength of an operating frequency of said plate member.

2. The device of claim 1 wherein said vibrating units are arranged in a bi-morph configuration.

3. The device of claim 2 wherein the frequency of said vibrating units varies in accordance with characteristics of said plate member which vary during operation in order to maintain said standing wave.

4. The device of claim 2 wherein said vibrating units are circular ceramic piezoelectric transducers which are each of the same dimensions.

5. The device of claim 4 wherein said plate member is a mirror.

6. The device of claim 1 wherein said vibrating means is located centrally on said plate member.

7. The device of claim 1 wherein said plate member is attached to a housing by foam.

8. The device of claim 7 wherein said foam supports said plate member over the majority of the surface of said plate member.

9. The device of claim 7 wherein said foam allows attachment of said plate member to said housing without resulting in significant dampening of said standing wave form.

10. The device of claim 9 wherein said plate member is a mirror.

11. A self cleaning mirror unit comprising a planar mirror, and two ceramic piezoelectric transducers mounted directly on the non reflective side of said mirror in a Bi-morph configuration for producing a standing wave substantially perpendicular to the plane of said mirror at an uniform frequency, substantially equal to the corresponding resonant frequency of said mirror in order to remove foreign substances from the surface of said mirror, said transducers being the same size and contacts said mirror over an area whose diameter is smaller than or equal to half the wavelength of an operating frequency of said mirror.

12. The self cleaning mirror unit of claim 11 wherein foam is used to mount said mirror in a housing.

13. The self cleaning mirror unit of claim 12 wherein said foam supports said mirror over the majority of the surface of said mirror.

14. The self cleaning mirror unit of claim 12 wherein said foam allows attachment of said mirror to said housing without resulting in significant dampening of said standing wave form.

15. The self-cleaning mirror of claim 11 wherein the frequency of said piezoelectric transducers varies in accordance with characteristics of said mirror vary during operation in order to maintain said standing wave.

* * * * *